United States Patent [19]

Kurosawa

[11] 4,072,159

[45] Feb. 7, 1978

[54] EMERGENCY VALVE INCORPORATING THERMAL FOAMABLE PLASTIC MATERIAL

[76] Inventor: Toyoki Kurosawa, No. 22-1-201, 3-chome, Unoki, Ootaku, Tokyo, Japan, 145

[21] Appl. No.: 642,522

[22] Filed: Dec. 19, 1975

[30] Foreign Application Priority Data

Feb. 22, 1975 Japan .................. 50-21462

[51] Int. Cl.² .............. F16K 17/38; A62C 37/06
[52] U.S. Cl. .................. 137/67; 137/79; 138/89; 166/57; 251/11
[58] Field of Search ......... 251/4, 5, 11, 61.1; 166/57, 302; 138/89, 93; 236/68 C, 93, 93 A, 101 R, 102; 137/67, 75, 76, 77, 79, 457; 60/527, 528

[56] References Cited

U.S. PATENT DOCUMENTS

| | | | |
|---|---|---|---|
| 1,254,888 | 1/1918 | Deegan et al. | 236/99 J |
| 2,241,086 | 5/1941 | Gould | 251/5 X |
| 2,662,550 | 12/1953 | Meyer | 251/4 X |
| 2,884,866 | 5/1959 | Patterson | 251/5 X |
| 2,902,222 | 9/1959 | Noakes | 236/93 A |
| 3,047,008 | 7/1962 | Clarkson | 251/5 X |
| 3,156,263 | 11/1964 | Adelman | 251/4 X |
| 3,890,994 | 6/1975 | Olsen | 251/61.1 X |
| 3,904,111 | 9/1975 | Petersson | 236/101 R X |

*Primary Examiner*—Martin P. Schwadron
*Assistant Examiner*—Richard Gerard
*Attorney, Agent, or Firm*—William D. Hall; Geoffrey R. Myers

[57] ABSTRACT

This emergency valve comprises a thermal foamable plastics element or a valve operation gear with a built-in thermal foamable plastics element, which is functioned by thermal foaming and expansion of the built-in thermal foamable plastics, and if a fire broken out near the valve, the valve should be automatically and non-reversibly closed or opened by the valve operation gear which is functioned by thermal foamed plastics or thermal foamed plastics in itself.

3 Claims, 10 Drawing Figures

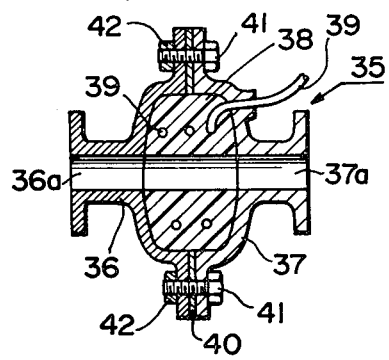
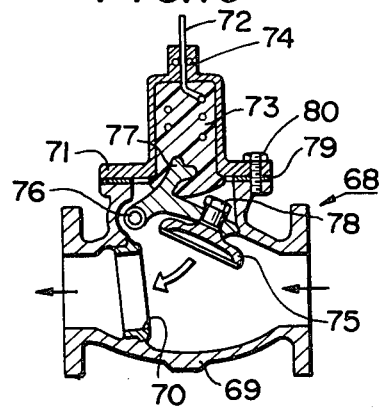
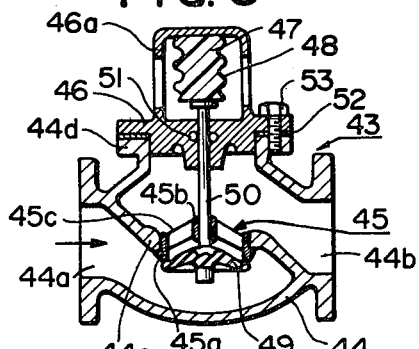
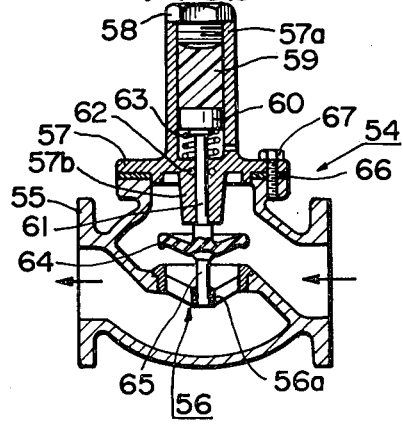

EMERGENCY VALVE INCORPORATING THERMAL FOAMABLE PLASTIC MATERIAL

FIELD AND BACKGROUND OF THE INVENTION

This invention relates to an emergency valve which automatically functions and shuts off or blows off the flow of fluid without any power supply, when it is exposed to a fire or high temperature.

If a chemical plant was on fire or overheated, some valves of the plant should be closed or opened as soon as possible, therefore many kind of automatons or alarm devices are proposed, but those conventional apparatuses require their power source, if not so, must be handled by the manual control.

The emergency measures must surely be performed without any hindrance and delay, whatever may happen, for example, a series of accidents, power breakdown, explosion, panic, misoperations, foul weather and the like may happen one above the other.

Therefore, the apparatuses which need the manual control or power supply are not sufficiently satisfactory as safety device for the above-mentioned purposes.

SUMMARY OF THE INVENTION

This invention is, therefore, directed to a novel automatic emergency valve which never requires any power supply or manual control.

According to the present invention, the most simply constructed emergency valve consists of only a valve casing with a built-in thermal foamable plastics element which foams and expands to block up the pipeline, when heated over the point of foaming.

A heat sensing element or elements are able to be used for the increase in the heat conduction from the exterior of the valve to the thermal foamable plastics element.

And, a heavy duty type or large sized valve comprises a valve operation gear which is functioned by foaming and expansion of the built-in thermal foamable plastics element, the valve is automatically closed or opened by the valve operation gear, in case of emergency.

BRIEF DESCRIPTION OF THE DRAWINGS

The invention will now be fully described with reference to the accompanying drawings, in which;

FIG. 7, a sectional view of an emergency stop valve having a partially coiled heat sensing element in a thermal foamable plastics element;

FIG. 8, a sectional view of a globe type emergency open valve having a valve operation gear of the bellows type;

FIG. 9, a sectional view of a globe type emergency stop valve having a valve operation gear of the piston type and;

FIG. 10, a sectional view of a swing type emergency stop valve.

DESCRIPTION OF THE PREFERRED EMBODIMENT

Figure 1:
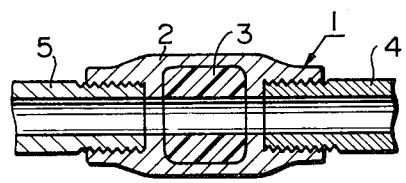
FIGS. 1 to 4 are sectional views every one of which shows the most simply constructed emergency stop valve embodying the present invention, respectively.

In FIG. 1, the numeral 1 represents an emergency stop valve is composed of a casing 2 and a thermal foamable plastics ring 3 which is molded in an annular pocket of the casing 2 and the numerals 4 and 5, an inlet pipe and an outlet pipe respectively.

The valve of this type is suitable to the applications for a fuel pipeline of the household boiler or the like which is placed in danger of overheat.

In this case, the emergency stop valve 1 should be installed in a place which is usually so cool that the thermal foamable plastics ring 3 is not beginning to foam, but when a fire or an overheat happens, becomes high temperature at which the thermal foamble plastics ring 3 begins to foam and expands to enormous volume, therefore, the pipeline is blocked up by foamed plastics to shut off the fuel supply.

The contents and character of thermal foamable plastics will be described hereinafter, but foamed plastics has high viscosity and a certain measure of the heat-resisting property, therefore, the fuel supply is shut down at least temporarily. When the accident results from a falling of the water level in the boiler, the overheating dies naturally down, and when it results from a fire, the fuel supply is shut down, so that a margin for the fire extinguishing is obtained.

Figure 2:
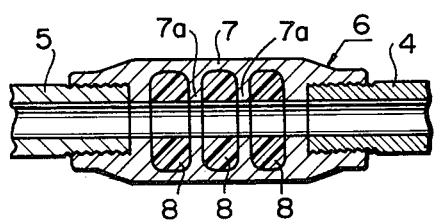

In FIG. 2, the numeral 6 is an emergency stop valve which is similar to the emergency stop valve 1 of FIG. 1, but comprises a casing 7 having three pockets in each of which the thermal foamable plastics ring 8 is packed respectively.

The annular partitions 7a, 7a of the casing 7 are helpful for conducting external heat to the plastics rings 8, 8 to shorten lag time.

Figure 3:
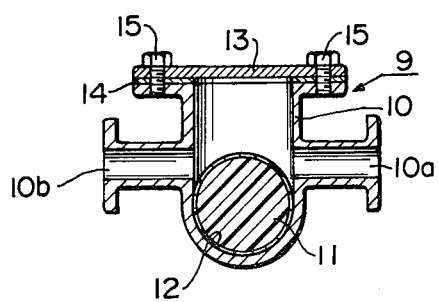

In FIG. 3, the numeral 9 represents an emergency stop valve which is composed of a casing 10 having inlet and outlet ducts 10a and 10b, which are connectable to a desired pipeline, a thermal foamable plastics ball 11 which is packed in a silicone rubber bag 12, a top cover 13, a gasket 14 and stud bolts 15, 15.

In this case, the thermal foamable plastics 11 is isolated from air and fluid, being packed airtightly in the silicon rubber bag 12 to preserve thermal foamable plastics from chemical deterioration and equipments from pollution by foamed plastics. The emergency stop valve 9 is lastingly shut off, because produced gas and foam are kept in the silicone rubber bag 12.

Figure 4:
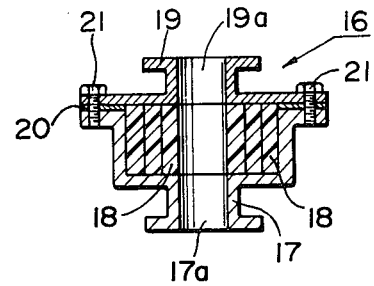

In FIG. 4, the numeral 16 represents an emergency stop valve which is composed of a cuplike casing 17 having a duct 17a which is connectable to a desired pipeline, a thermal foamable plastics mat 18 which is rolled in the cuplike casing 17 into a cylindrical form so that the fuel path may not be restricted, a top cover 19 having a duct 19a which is connectable to the desired pipeline, a gasket 20 and stud bolts 21, 21.

These emergency stop valves 9 and 16 are used as same as the emergency stop valve 1 or 6 is used.

Figure 5:
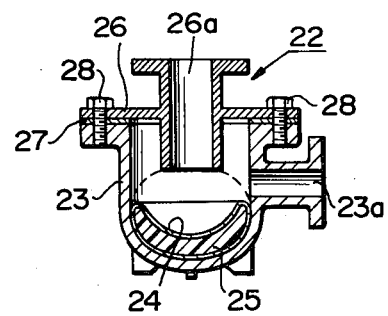
FIG. 5, a sectional view of an emergency stop valve which comprises a shell-like canned thermal foamable plastics element.

In FIG. 5, the numeral 22 represents an emergency stop valve of the angle type, which is composed of a casing 23 having a duct 23a; a shell-like can 24, thermal foamable plastics 25 which is canned in the shell-like can 24, a top cover 26 having a duct 26a, a gasket 27 and stud bolts 28, 28.

The shell-like can 24 is sprung into inflation, changes its form into a globe and blocks up the duct 26a of the top cover 26, when the thermal foamable plastics 25 is heated over its foaming temperature.

The emergency stop valve 22 is suitable not only for domestic use, but also for a chemical plant, oil refinery or the like.

Figure 6:
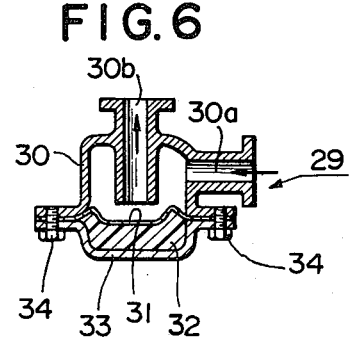
FIG. 6, a sectional view of an emergency stop valve having a thermal foamable plastics element which is isolated from fluid by a diaphragm.

In FIG. 6, the numeral 29 represents an emergency stop valve which is composed of casing 30 having two ducts 30a and 30b, a rubber or metallic diaphragm 31, thermal foamable plastics 32, a bottom cover 33 and stud bolts 34, 34.

If thermal foamable plastics 32 of the emergency stop valve 29 is foamed and expands, the diaphragm 31 is forced up to block up the duct 30b of the casing 30.

The advantages of the emergency stop valve 29 is similar to those of the emergency stop valve 9 shown in FIG. 3.

In FIG. 7, the numeral 35 represents an emergency stop valve which is composed of two cuplike casings 36 and 37 having their ducts 36a and 37a each of which is connectable to a desired pipeline, respectively, a thermal foamable plastics ring 38, a heat sensing element 39 which is partially coiled and embedded in the thermal foamable plastics ring 38, a gasket 40, bolts 41, 41 and nuts 42, 42.

The free end of the heat sensing element 39 is penetrating the wall of the cuplike casing 37 and reaches to the place which is apt to be overheated or a danger point in the plant.

When the free end of the heat sensing element 39 is extremely heated, the thermal foamable plastics ring 38 immediately begins to foam and block up the fuel path.

The heat sensing element 39 is useful not only to shorten delay time of heat conduction, but also to prevent a big accident which exposes the emergency stop valve 35 to strong heat.

The heat sensing element is able to be applied to any of the emergency valves which are shown in FIGS. 1 through 6.

In FIG. 8, the numeral 43 represents a globe type emergency open valve having a bellows type valve operation gear; 44, a valve casing of the globe type; 45, a valve seat; 46, a valve operation gear casing having a valve yoke 46a; 47, a thermal foamable plastics which is packed in a bellows 48; 49, a valve; 50, a connecting rod; 51, an 0-ring; 52, a gasket and 53, stud bolts.

The valve casing 44 comprises an inlet duct 44a, an outlet duct 44b, an internal partition 44c and a flange 44d on which the valve operation gear casing 46 is mounted.

The valve seat 45 is made into a wheel-like, shaped member which consists of an annular valve seat element 45a, a center boss 45a and supporting bars 45c, 45c which joint the center boss 45b with the annular seat element 45a, and is fixedly fitted in a port of the partition 44c of the valve casing 44, as shown in FIG. 8.

The one end of the bellows 48 in which the thermal foamable plastics 47 is packed is fixed in the valve yoke 46a of the top cover 46, on the center line of the valve seat 45.

The connecting rod 50 is airtightly and slidably penetrating the top cover 46, and loosely inserted into a hole which is bored through the center boss 45b of the valve seat 45, connecting the free end of the bellows 48 with the valve 49.

This emergency open valve is usually closed, but when the thermal foamable plastics 47 in the bellows 48 is heated over the point of foaming, the bellows 48 is elongated by internal pressure thereof to force down the valve 49 in opposition to back pressure thereof, then the valve port is opened.

In FIG. 9, the numeral 54 represents an emergency stop valve having a piston type valve operation gear; 55, a globe type valve casing; 56, a valve seat; 57, a valve operation gear casing having a cylinder barrel 57a; 58 a top cover; 59, thermal foamable plastics; 60, a piston; 61, a piston rod; 62, an o-ring; 63, a spring; 64, a valve; 65, a guide bar; 66, a gasket and 67, stud bolts.

The valve casing 55 and the valve seat 56 are constructed similarly to the valve casing 44 and the valve seat 45 shown in FIG. 8, and jointed with each other.

The piston rod 61 joints the piston 60 with the valve 64, airtightly and slidably penetrating the bottom wall 57b of the valve operation gear casing 57.

The guide bar 65 is fixedly attached to the valve 64 and loosely inserted into the center guide hole of the center boss 56a of the valve seat 56.

The assembly which consists of the piston 60, the piston rod 61, the valve 64 and the guide bar 65 is born by the spring 63 which is installed in cylinder barrel 57a.

And the space between the piston 60 and the top cover 58 in the cylinder barrel 57a of the valve operation gear casing 57 is filled with the thermal foamable plastics 59.

When the thermal foamable plastics 59 is heated over the point of foaming, it begins energetic foaming, therefore, the piston 60 is forced down with high pressure of foaming.

Then, the valve 64 is also forced down and descends to block up the valve port. Once the valve port is shut off, the valve 64 is strongly pressed against the valve seat 56 by the back pressure thereof, then fluid flow is shut off, even if thermal foamed plastics burnt away, for all time.

The heat sensing element is able to be used for the emergency stop valve of this type.

FIG. 10 shows an emergency stop valve 68 of the swing type which consists of a valve casing 69 having inlet and outlet ducts, a valve seat 70, a top cover 71, a heat sensing element 72, thermal foamable plastics 73, an o-ring 74, a valve 75, a hinge pin 76, a hinged lever 77, a nut 78, a gasket 79 and stud bolts 80, 80.

The valve seat 70 is fixedly fitted in the port of the valve casing 69, as shown in FIG. 10, and the hinge pin 76 is airtightly and fixedly penetrating the valve casing 69.

And the hinged lever 77 consists of three arms, viz., a hinged arm one end of which is journaled on the hinge pin 76, a forked arm to one end of which the valve 75 is fixedly attached and a supporting arm one end of which is embedded in the thermal foamable plastics 73.

The coiled part of the heat sensing element 72 is embedded in the thermal foamable plastics 73, and the free end of the heat sensing element 72 is penetrating the wall of the valve operation gear casing 71 to be extended to the desired point in the plant.

If any part of the heat sensing element 72 is heated, the thermal foamable plastics 73 begins to foam, therefore the hinged lever 77 is released from restriction, the valve 75 is caused to swing toward the valve seat 70 by foaming pressure and flow of fluid to block up the valve port.

Henceforward, the valve 75 is strongly pressed against the valve seat 70 by back pressure and flowing friction of fluid therefore the valve port is shut off semi-permanently.

Thermal foamable plastics should be given the suitable foaming point, expansion ratio and chemical stability, and foaming and foamed plastics should be given suitable viscosity or stiffness, and certain measure of thermal resistance.

A few preferred embodiments are described as follows;

EXAMPLE 1

A. Composition;
1. Polystyrene (Base Resin) — 100 parts in weight
2. Azodicarbonamide (ADCA; Foaming Agent) — 4 parts in weight
3. Calcium Stearate (Foaming Auxiliary Agent) — 2 parts in weight
4. Calcium Carbonate (Filler) — 10 parts in weight B. Use and Performance;

The mixture of said materials is able to be used as thermal foamable plastics of the emergency valves shown in FIG. 8 or 9, being loaded in the bellows 48 of cylinder barrel 57a.

Also, the mixture is able to be molded into any desired shape, for example, the shape which is suitable for one of the valves shown in FIGS. 3 to 7, at the 140° C under the molding pressure of 100 kg/cm$^2$, and the moldings are able to be assembled with the suitable valves, being packed in the silicone rubber bag or the desired can, or being coated with desired paints or plating.

It is recommeded to adopt sandwiched or laminated molding in which stratified seats of metallic wire gauze are comprised.

When the laminated molding which comprises metallic wire guaze is used, the time required for shutting off fuel supply is shortened and the comparatively longer closed time is guaranteed for such simple valves as shown in FIG. 4 or 7.

The emergency valve in which this thermal foamable plastics is adopted should shut off the fuel gas flow within 2 to 4 minutes, when it is used in a fuel gas line, if it is brought into contact with 170° C atmosphere.

EXAMPLE 2

A. Composition;
1. Popcorn Plastics (Koppers Co.)

B. Use and Performance;

This well known granular polystryrene resin foams at 90° to 105° C, and expands by 30 to 50 times, if it is not suppressed. And this resin is able to be adopted in the same manner as thermal foamable plastics of Example 1.

EXAMPLE 3

A. Composition;
1. Acrylonitrile-butadiene-styrene (Base Resin) — 100 parts in weight
2. Azobisisobutyonitrile (AZDN; Foaming Agent) — 5 parts in weight B. Use and Performance;

The elements are mixed, kneaded annexing suitable solvent, for example, a small quantity of aceton, and molded into a desired shape which is suitable for some one of the valves described above, and dried.

This thermal foamable plastics is adoptable for all the type of the emergency valves described above.

The emergency valve in which this thermal foamable plastics is used should function to shut off the supply of fuel gas within 1 to 3 minutes, if it is brought into contact with 170° C atmosphere.

EXAMPLE 4

A. Composition;
1. Polystyrene (Basic Resin) — 100 parts in weight
2. Azodicarbonamide (ADCA; Foaming Agent) — 5 parts in weight
3. Dinormaloctylphthalate (DOP; Adhesive Agent) — 0.5 parts in weight B. Use and Performance;

The elements are used as same as the elements which are shown as Example 1.

The emergency valve in which this thermal foamable plastics is used functions within 1 to 3 minutes, when it is brought into contact with 200° C.

EXAMPLE 5

A. Composition;
1. Epikoto 828 (Shell Chemicals Corp.) — 100 parts in weight
2. Diethylpropylamine (DEPA; Hardner) — 8 parts in weight
3. Paratoluenesulfonylhydrazide (TSH; Foaming Agent) — 5 parts in weight
4. Gelatine (Gelatinizer) —

Epikote 828 is condensation resin which is composed of bisphenol A and epichlorohydrin, i.e., epoxy resin.

B. Use and Performance;

The first step is to micro-capsule Epikote 828 and DEPA into gelatine micro-capsules of 50 microns in size, according to the well known method which is described in the specification of U.S. Pat. No. 3,116,206, 1973, separately.

Then separately miceo-capsulated Epikote and DEPA are gently mixed together with TSH, and packed into the silicone rubber bag, bellows, cylinder barrel, can or the like, to adopt into desired emergency valve.

The emergency valve in which this micro-capsulated epoxy resin is used functions within 1 to 3 minutes, when it is brought into contact with 120° C atmosphere.

This resin becomes hard after foaming, therefore, it is recommendable for the objects of the present invention.

The disclosed embodiments are representative of presently preferred forms of the invention, but are intended to be illustrative rather than definitive thereof. The invention is defined in the claims.

What I claim is;

1. An emergency shut-off valve for irreversibly stopping the flow of material in a conduit when an excessive temperature external to the valve is sensed by the valve, said valve comprising a valve casing defining a chamber which communicates with said conduit, and a thermally foamable heat-resistant plastic element residing in said chamber in an amount sufficient to irreversibly expand into said conduit and shut off the flow of material therein, said element in unexpanded condition allowing the flow of material through said conduit; and wherein said thermally foamable heat-resistant plastic element located in said chamber is packed in a stretchable membrane which comprises a shell-like expandable can of a material that will spring into an inflated condition closing off flow upon expansion of said plastic element.

2. An emergency shut-off valve according to claim 1, wherein said plastic element is fully encased in said membrane and said membrane comprises an expandable container capable of protecting the plastic element from deterioration and the valve from plastic contamination.

3. An emergency shut-off valve according to claim 1 which further includes a means for sensing excessive temperature at a spaced distance from said valve and in response thereto causing said plastic element to irreversibly expand into said conduit.

* * * * *